(12) United States Patent
Su

(10) Patent No.: US 10,381,877 B2
(45) Date of Patent: Aug. 13, 2019

(54) ELECTRICAL ENERGY RECEIVING END CAPABLE OF OVERVOLTAGE PROTECTION AND WIRELESS ELECTRICAL ENERGY TRANSMISSION DEVICE

(71) Applicant: NINGBO WEIE ELECTRONIC TECHNOLOGY CO., LTD., Zhenhai, Ningbo (CN)

(72) Inventor: Hengyi Su, Ningbo (CN)

(73) Assignee: Ningbo WeiE Electronic Technology Co., Ltd., Zhenhai, Ningbo (CN)

( * ) Notice: Subject to any disclaimer, the term of this patent is extended or adjusted under 35 U.S.C. 154(b) by 422 days.

(21) Appl. No.: 15/385,155

(22) Filed: Dec. 20, 2016

(65) Prior Publication Data
US 2017/0187244 A1 Jun. 29, 2017

(30) Foreign Application Priority Data
Dec. 23, 2015 (CN) .......................... 2015 1 0988644

(51) Int. Cl.
| | |
|---|---|
| *H02J 50/12* | (2016.01) |
| *H02H 9/04* | (2006.01) |
| *H02J 7/02* | (2016.01) |
| *H02M 1/32* | (2007.01) |
| *H02M 3/04* | (2006.01) |
| *H02M 7/06* | (2006.01) |
| *H02H 3/20* | (2006.01) |

(52) U.S. Cl.
CPC ............. *H02J 50/12* (2016.02); *H02H 9/043* (2013.01); *H02H 9/044* (2013.01); *H02J 7/025* (2013.01); *H02M 1/32* (2013.01); *H02M 3/04* (2013.01); *H02M 7/06* (2013.01); *H02H 3/20* (2013.01); *H02H 9/04* (2013.01)

(58) Field of Classification Search
USPC .......................................... 361/91.1; 307/104
See application file for complete search history.

(56) References Cited

U.S. PATENT DOCUMENTS

| | | | | |
|---|---|---|---|---|
| 2012/0050931 | A1* | 3/2012 | Terry ....................... | H02H 9/04 361/91.5 |
| 2015/0318713 | A1* | 11/2015 | Kim ......................... | H02H 3/08 307/104 |

\* cited by examiner

*Primary Examiner* — Danny Nguyen
(74) *Attorney, Agent, or Firm* — Charles C. Achkar; Ostrolenk Faber LLP

(57) ABSTRACT

An electrical energy receiving end capable of overvoltage protection and a wireless electrical energy transmission device are provided. An electrical energy receiving coil is divided into a first receiving coil and a second receiving coil, so that under normal operation the first receiving coil and the second receiving coil jointly resonate with an impedance matching network to receive energy. When the electrical energy receiving end has an overvoltage, the first receiving coil and the impedance matching network (or the second receiving coil and the impedance matching network) form a loop, and due to the impedance mismatch, the energy received by the electrical energy receiving end is greatly reduced to solve the problem of overvoltage at the electrical energy receiving end.

14 Claims, 4 Drawing Sheets

ELECTRICAL ENERGY RECEIVING END CAPABLE OF OVERVOLTAGE PROTECTION AND WIRELESS ELECTRICAL ENERGY TRANSMISSION DEVICE

CROSS REFERENCE TO RELATED APPLICATIONS

The present application claims the benefit of priority of Chinese Application No. 201510988644.0, filed Dec. 23, 2015 the subject matter of which is incorporated herein by reference in its entirety.

FIELD OF THE INVENTION

The present invention relates to a wireless charging field, and more particularly to an electrical energy receiving end capable of overvoltage protection and a wireless electrical energy transmission device.

BACKGROUND OF THE INVENTION

Wireless electrical energy transmission has the advantages of safety, convenience and the like, so it is widely applied to the electronic charging field. Wireless electrical energy transmission can be achieved by means of electromagnetic induction or magnetic resonance. In general, the way of magnetic resonance is commonly used. A wireless electrical energy transmission device used for magnetic resonance includes an electrical energy transmitting end and an electrical energy receiving end to transmit energy by means of electromagnetic resonance.

In general, the electrical energy transmitting end includes an inverter, an impedance matching circuit, and a transmitting coil. The receiving part comprises a receiving coil, an impedance matching network, a rectification circuit, and a direct current (hereinafter "DC") voltage conversion circuit (DC-DC converter). During the working process, the electrical energy transmitting end receives the alternating current to generate a spatial magnetic field, and the electrical energy receiving end inducts the alternating magnetic field to generate a desired voltage signal to the electronic equipment. However, during electrical energy transmission, the coupling between the electrical energy transmission coil and the electrical energy receiving coil may have a change. For example, a sudden increase in coupling or a sudden increase in the magnetic field energy of the transmitting coil, which causes the DC voltage $V_{rect}$ after the rectification circuit exceeds the preset voltage. The excessive voltage will damage the DC-DC converter of the electrical energy receiving end, even the electronic equipment of the load side.

SUMMARY OF THE INVENTION

In view of the problems of the prior art, the primary object of the present invention is to provide an electrical energy receiving end capable of overvoltage protection and an wireless electrical energy transmission device. An electrical energy receiving coil is divided into at least two receiving coils, so that under normal operation the receiving coils jointly resonate with an impedance matching network to receive energy. When the electrical energy receiving end having has an overvoltage, one of the receiving coils and the impedance matching network form a loop, and due to the impedance mismatch of the loop, the energy received by the electrical energy receiving end is greatly reduced to solve the problem of overvoltage at the electrical energy receiving end.

According to an aspect of the present invention, an electrical energy receiving end capable of overvoltage protection is provided. The electrical energy receiving end is used for receiving energy transmitted from a spaced electrical energy transmitting end. The electrical energy receiving end comprises a receiving coil, an impedance matching network, a rectifier and filter circuit, a DC-DC converter, and an overvoltage protection switching circuit. The receiving coil comprises a first receiving coil and a second receiving coil. The first receiving coil and the second receiving coil are orderly connected in series between an input terminal of the electrical energy receiving end and the rectifier and filter circuit. The impedance matching network comprises a first impedance circuit connected in series with the first receiving coil. The receiving coil resonates with the impedance matching network to be coupled with magnetic field energy transmitted by the electrical energy transmitting end to generate a high-frequency alternating voltage signal. The rectifier and filter circuit receives the high-frequency alternating voltage signal to generate a DC voltage signal. The DC-DC converter receives the DC voltage signal to convert to a desired output voltage to an electronic device. The overvoltage protection switching circuit is connected in series between the receiving coil and a ground terminal. When the DC voltage signal exceeds a preset voltage value after detection, the switching state of the overvoltage protection switching circuit is controlled through a switching control signal, enabling the DC voltage signal not to exceed the preset voltage value.

Furthermore, the electrical energy receiving end further comprises an overvoltage control circuit to generate the switching control signal. The overvoltage control circuit comprises a sampling circuit and a hysteresis comparator. The sampling circuit samples the DC voltage signal to obtain a sampled voltage signal. The hysteresis comparator receiving the sampled voltage signal and a first reference voltage signal to output the switching control signal. When the sampled voltage signal is greater than an upper limit voltage value of the hysteresis comparator, the switching control signal is in an effective state for controlling the overvoltage protection switching circuit to be turned on. When the sampled voltage signal is less than a lower limit voltage value of the hysteresis comparator, the switching control signal is in a dull state for controlling the overvoltage protection switching circuit to be turned off.

Preferably, the rectifier and filter circuit comprises a half-bridge rectifier circuit and a filter capacitor. The half-bridge rectifier circuit comprises a first diode and a second diode. The first diode is connected between the second receiving coil and the ground terminal. The second diode is connected between the second receiving coil and the filter capacitor. The half-bridge rectifier circuit receives the high-frequency alternating voltage signal to output a half-wave voltage signal. The filter capacitor receives the half-wave voltage signal to obtain the DC voltage signal.

Preferably, the first impedance circuit comprises a first impedance capacitor. The first impedance capacitor is connected between the first receiving coil and the second receiving coil. The overvoltage protection switching circuit comprises a first overvoltage protection switch. The first overvoltage protection switch is connected between a common connection point of the first impedance capacitor and the second receiving coil and the ground terminal.

Furthermore, the impedance matching network further comprises a second impedance circuit. The second impedance circuit comprises a second impedance capacitor. The second impedance capacitor is connected between the second receiving coil and the rectifier and filter circuit.

Furthermore, the overvoltage protection switching circuit further comprises a first overvoltage protection capacitor. The first overvoltage protection capacitor and the first overvoltage protection switch are connected in series between the first impedance capacitor and the ground terminal.

Preferably, the rectifier and filter circuit comprises a full-bridge rectifier circuit and a filter circuit. The full-bridge rectifier circuit comprises a third diode and a fourth diode which are connected in series, and a fifth diode and a sixth diode which are connected in series. The two pairs of series-connected diodes are then connected in parallel. A common connection terminal of the third diode and the fifth diode outputs a half-wave voltage signal. A common connection terminal of the fourth diode and the sixth diode is connected to the ground terminal. The filter capacitor receives the half-wave voltage signal to obtain the DC voltage signal.

Furthermore, an end of the first receiving coil is connected to the input terminal of the electrical energy receiving end. An end of the second receiving coil is connected to a common connection point of the third diode and the fourth diode. The first impedance circuit comprises a first impedance capacitor. The first impedance capacitor is connected between the first receiving coil and the second receiving coil. The overvoltage protection switching circuit comprises a second overvoltage protection switch and a third overvoltage protection switch. The second overvoltage protection switch is connected between a common connection point of the first impedance capacitor and the second receiving coil and the ground terminal. The third overvoltage protection switch is connected between the input terminal of the electrical energy receiving end and the ground terminal. Both the second overvoltage protection switch and the third overvoltage protection switch control their switching operation through the switching control signal. The switching states of the second overvoltage protection switch and the third overvoltage protection switch are the same.

Furthermore, the impedance matching network further comprises a second impedance circuit. The second impedance circuit comprises a second impedance capacitor. The second impedance capacitor is connected between the second receiving coil and the rectifier and filter circuit.

Furthermore, the overvoltage protection switching circuit further comprises a second overvoltage protection capacitor and a third overvoltage protection capacitor. The second overvoltage protection capacitor and the second overvoltage protection switch are connected in series between a common connection joint of the first impedance capacitor and the second receiving coil and the ground terminal. The third overvoltage protection capacitor and the third overvoltage protection switch are connected in series between the input terminal of the electrical energy receiving end and the ground terminal.

Furthermore, the electrical energy receiving end further comprises a third receiving coil. The third receiving coil is connected between the input terminal of the electrical energy receiving end and a common connection joint of the fifth diode and the sixth diode.

Furthermore, the electrical energy receiving end further comprises a second impedance circuit and a third impedance circuit. The second impedance circuit comprises a second impedance capacitor. The second impedance capacitor is connected between the second receiving coil and the rectifier and filter circuit. The third impedance circuit comprises a third impedance capacitor. The third impedance capacitor is connected between the third receiving coil and the rectifier and filter circuit.

Furthermore, the overvoltage protection switching circuit further comprises a second overvoltage protection capacitor and a third overvoltage protection capacitor. The second overvoltage protection capacitor and the second overvoltage protection switch are connected in series between a common connection joint of the first impedance capacitor and the second receiving coil and the ground terminal. The third overvoltage protection capacitor and the third overvoltage protection switch are connected in series between the input terminal of the electrical energy receiving end and the ground terminal.

According to another aspect of the present invention, a wireless electrical energy transmission device is provided. The wireless electrical energy transmission device comprises an electrical energy transmitting end and an electrical energy receiving end which are spaced apart from each other. The electrical energy receiving end is as the aforesaid.

According to the forgoing electrical energy receiving end capable of overvoltage protection and the wireless electrical energy transmission device, the electrical energy receiving coil is divided into the first receiving coil and the second receiving coil, so that under normal operation the first receiving coil and the second receiving coil jointly resonate with the impedance matching network to receive energy. When the electrical energy receiving end has an overvoltage, the first receiving coil and the impedance matching network (or the second receiving coil and the impedance matching network) form a loop, and due to the impedance mismatch, the energy received by the electrical energy receiving end is greatly reduced to solve the problem of overvoltage at the electrical energy receiving end.

DESCRIPTION OF THE PREFERRED EMBODIMENTS

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

Figure 1:
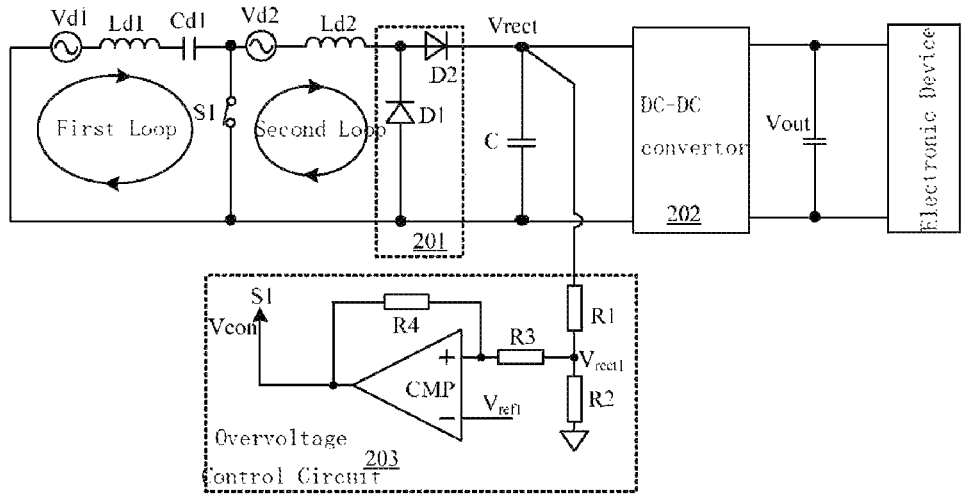
FIG. 1 is a circuit diagram of an electrical energy receiving end in accordance with a first embodiment of the present invention.

FIG. 1 is a circuit diagram of an electrical energy receiving end in accordance with a first embodiment of the present invention. The electrical energy receiving end is applied to a wireless electrical energy transmission device. In the following embodiments, the wireless electrical energy transmission device includes an electrical energy transmitting end and an electrical energy receiving end which are spaced apart from each other. The electrical energy transmitting end receives alternating power to generate a spatial magnetic field.

In this embodiment, the electrical energy receiving end includes a receiving coil, an impedance matching network, a rectifier and filter circuit 201, a DC-DC converter 202, and an overvoltage protection switching circuit. Specifically, the receiving coil comprises a first receiving coil Ld1 and a second receiving coil Ld2. The first receiving coil Ld1 and the second receiving coil Ld2 are orderly connected in series between an input terminal of the electrical energy receiving end and the rectifier and filter circuit 201. The first receiving coil is coupled with the spatial magnetic field generated by the electrical energy transmitting end to obtain a first alternating voltage signal Vd1. The second receiving coil is coupled with the spatial magnetic field generated by the electrical energy transmitting end to obtain a second alternating voltage signal Vd2. As shown in FIG. 1, the first alternating voltage signal Vd1 and the second alternating voltage signal Vd2 are connected in series to supply a voltage signal to the latter stage circuit. The turns ratio of the first alternating voltage signal Vd1 to the second alternating voltage signal Vd2 can be appropriately set to adjust the ratio of the first alternating voltage signal Vd1 to the second alternating voltage signal Vd2.

Specifically, in this embodiment, the impedance matching network includes a first impedance circuit connected in series with the first receiving coil Ld1. The first impedance circuit includes a first impedance capacitor Cd1. The first impedance capacitor Cd1 is connected between the first receiving coil Ld1 and the second receiving coil Ld2.

The receiving coil (including the first receiving coil and the second receiving coil) resonates with the impedance matching network (the first impedance capacitor) to be coupled with the magnetic field energy transmitted by the electrical energy transmitting end to generate a high-frequency alternating voltage signal. It should be noted that under normal operation, the equivalent inductive reactance of the first and second receiving coils and the resonant frequency of the first impedance capacitor are the same as the operating frequency of the system, such as 6.78 MHz. At this time, the system's work efficiency is highest.

Specifically, the rectifier and filter circuit includes a half-bridge rectifier circuit 201 and a filter capacitor C. The half-bridge rectifier circuit includes a first diode D1 and a second diode D2. The first diode D1 is connected between the second receiving coil and a ground terminal. The second diode D2 is connected between the second receiving coil and the filter capacitor. The half-bridge rectifier circuit receives the high-frequency alternating voltage signal to output a half-wave voltage signal. The filter capacitor receives the half-wave voltage signal to obtain a DC voltage signal $V_{rect}$.

Thereafter, the DC-DC converter 202 receives the DC voltage signal to convert to a desired output voltage to an electronic device. The DC-DC converter may be a conventional circuit configuration, such as a boost converter, a buck converter, a buck-boost converter or other suitable circuits.

The overvoltage protection switching circuit includes a first overvoltage protection switch S1. The first overvoltage protection switch S1 is connected between a common connection point of the first impedance capacitor Cd1 and the second receiving coil Ld2 and the ground terminal. In this embodiment, the switching control signal $V_{con}$ is generated by an overvoltage control circuit 203. The overvoltage control circuit 203 includes a sampling circuit and a hysteresis comparator. The sampling circuit is composed of a divider resistor R1 and a resistor R2. The hysteresis comparator is composed of a resistor R3, a resistor R4, and a comparator CMP. The divider resistor R1 and the resistor R2 sample the DC voltage signal $V_{rect}$ outputted from the rectifier and filter circuit to obtain a sampled voltage signal $V_{rect1}$. The positive input terminal of the hysteresis comparator receives the sampled voltage signal $V_{rect1}$. The negative input terminal of the hysteresis comparator receives a first reference voltage signal $V_{ref1}$ representing the preset voltage value to output the switching control signal $V_{con}$. The switching control signal $V_{con}$ controls the first overvoltage protection switch S1 to be turned on or off.

Figure 2:
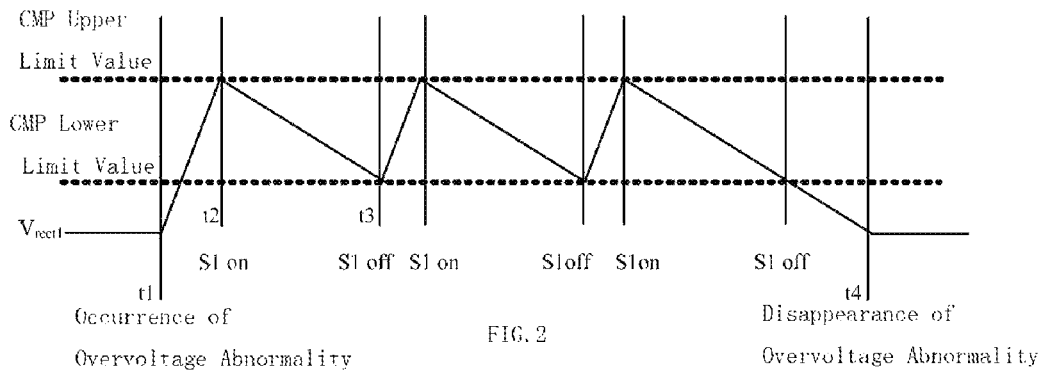
FIG. 2 shows a work waveform diagram of the circuit of FIG. 1.

FIG. 2 shows a work waveform diagram of the circuit of FIG. 1. The operation of the overvoltage protection of this embodiment of the present invention will be explained hereinafter, with reference to FIG. 2 and FIG. 1.

At t1, the external conditions have a change to cause an abnormity of the DC voltage signal $V_{out}$, and the DC voltage signal $V_{out}$ is increased constantly. At t2, when the sampled voltage signal $V_{rect1}$ is greater than the upper limit voltage value of the hysteresis comparator, which means that the DC voltage signal exceeds the preset voltage value, the switching control signal $V_{con}$ outputted from the comparator is in an effective state (for example, the high level is deemed as an effective state, and the low level is deemed as a null state). The first overvoltage protection switch S1 is turned on. The first receiving coil Ld1, the first impedance capacitor Cd1, and the first overvoltage protection switch S1 form a first current loop. The second receiving coil Ld2, the second diode D2, the filter capacitor C, and the first overvoltage protection switch S1 form a second current loop. Since the first impedance capacitor Cd1 and the first receiving coil Ld1 do not resonate due to the impedance mismatch, the energy of the coupling of the first receiving coil is greatly reduced, and the current of the first current loop won't be so large. For the second current loop, since the impedance of the second receiving coil Ld2 cannot be matched, the energy of transmission is small. The turns ratio of the first and second receiving coils can be set according to the aforesaid, so that the value of the second alternating voltage signal Vd2 is smaller. Accordingly, through the control of the first overvoltage protection switch S1, the DC voltage signal $V_{rect}$ starts to decrease. When the voltage drops to t3 and the sampled voltage signal $V_{rect1}$ is smaller than the lower limit voltage value of the hysteresis comparator, the switching control signal becomes the dull state for controlling the first overvoltage protection switch S1 to be turned off. The energy of the first receiving coil is transmitted to the rectifier and filter circuit again. If the abnormality still exists, the DC voltage signal $V_{rect}$ continues to rise until it reaches the upper limit voltage value of the hysteresis comparator. The first overvoltage protection switch S1 is turned on. According to the above-described procedure, the DC voltage signal $V_{rect}$ drops again until the time t4. The abnormality is released, and the DC voltage signal $V_{rect}$ drops to a value that doesn't exceed the preset voltage value.

As seen from the above-mentioned process, when the coupling condition of the electrical energy receiving end is abnormal, the output voltage is increased, causing damage to the DC-DC converter or the electronic device. Therefore, the present invention is to prevent the damage to the latter circuit. Through the detection of the DC voltage signal of the rectifier and filter circuit, the electrical energy receiving end is protected against overvoltage. The overvoltage protection scheme of the present invention does not need to add too many peripheral devices, and the control scheme is simple and clever, and can be used in a wireless electrical energy transmission device with half-bridge rectifier and filter.

Figure 3:
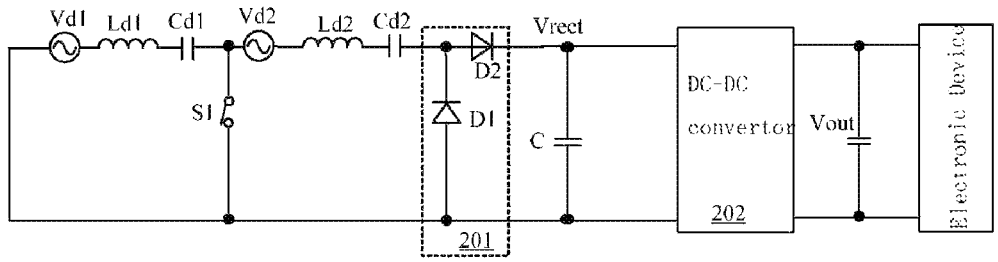
FIG. 3 is a circuit diagram of an electrical energy receiving end in accordance with a second embodiment of the present invention.

FIG. 3 is a circuit diagram of an electrical energy receiving end in accordance with a second embodiment of the present invention. The second embodiment is based on the first embodiment, and is further provided with a second impedance circuit. As shown in FIG. 3, the second impedance circuit is specifically a second impedance capacitor Cd2. The second impedance capacitor Cd2 is connected between the second receiving coil Ld2 and the rectifier and filter circuit. The overvoltage control circuit of the second embodiment is the same as that of the first embodiment, and is not shown in FIG. 3.

The working process of the second embodiment is substantially similar to that of the first embodiment with the exceptions described hereinafter. In the second embodiment, when the wireless electrical energy transmission device is under normal operation, the first overvoltage protection switch S1 is turned off. The equivalent inductance of the first receiving coil Ld1 and the second receiving coil Ld2 and the equivalent capacitance of the first impedance capacitor Cd1 and the second impedance capacitor Cd2 resonate with the system operating frequency, and the system is operating at the maximum efficiency. When the overvoltage occurs in the circuit, the first overvoltage protection switch S1 is turned on. Because the impedance mismatch between the first receiving coil Ld1 and the first impedance capacitor Cd1, the current of the first current loop is small. By providing the first impedance capacitor Cd1 and the second impedance capacitor Cd2, the current of the first current loop can be further reduced. Meanwhile, because the impedance mismatch between the second receiving coil Ld2 and the second impedance capacitor Cd2, the current of the second current loop is reduced, such that the energy outputted to the rectifier and filter circuit can be reduced and the DC voltage signal $V_{rect}$ can be rapidly decreased.

Figure 4:
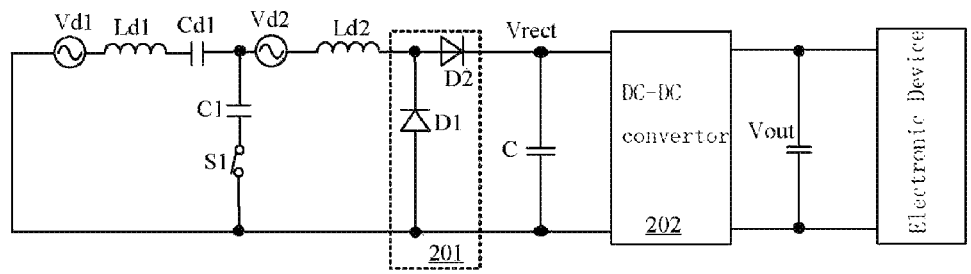
FIG. 4 is a circuit diagram of an electrical energy receiving end in accordance with a third embodiment of the present invention.

FIG. 4 is a circuit diagram of an electrical energy receiving end in accordance with a third embodiment of the present invention. The third embodiment is based on the first embodiment, and is further provided with a first overvoltage protection capacitor C1. The first overvoltage protection capacitor C1 and the first overvoltage protection switch S1 are connected in series between the first impedance capacitor Cd1 and the ground terminal.

The working process of the third embodiment is substantially similar to that of the first embodiment with the exceptions described hereinafter. In the third embodiment, when the overvoltage occurs in the circuit, the first overvoltage protection switch S1 is turned on. The first receiving coil Ld1, the first impedance capacitor Cd1, the first overvoltage protection capacitor C1, and the first overvoltage protection switch S1 form a first current loop. The second receiving coil Ld2, the second diode D2 (or the first diode D1), the filter capacitor C, the first overvoltage protection capacitor C1, and the first overvoltage protection switch S1 form a second current loop. Because the first impedance capacitor Cd1 and the first receiving coil Ld1 cannot resonate due to the impedance mismatch, the energy of the coupling of the first receiving coil is greatly reduced, and the current of the first current loop is not so large. In the third embodiment, since the first overvoltage protection capacitor C1 makes the degree of the mismatch between the first impedance capacitor Cd1 and the first receiving coil Ld1 increased, the current of the first current loop becomes small and the switching loss is small. Furthermore, when the resonant frequencies of the first overvoltage protection capacitor C1 and the second receiving coil Ld2 are set at the system operating frequency, the first overvoltage protection capacitor C1 and the second receiving coil Ld2 are parallel resonance, and the equivalent impedance of the first current loop approaches infinity, and the current of the loop is close to zero, and the system loss is very small. For the second current loop, the energy can be transmitted to the rectifier and filter circuit. By setting the turns ratio of the coils, the value of the second alternating voltage signal Vd2 is very small so that the overvoltage protection can be achieved.

Figure 5:
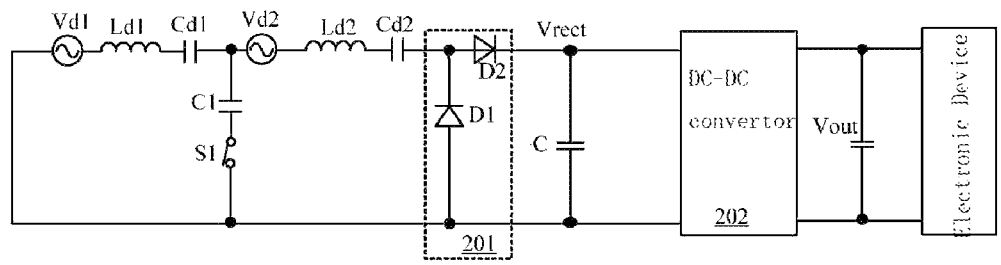
FIG. 5 is a circuit diagram of an electrical energy receiving end in accordance with a fourth embodiment of the present invention.

FIG. 5 is a circuit diagram of an electrical energy receiving end in accordance with a fourth embodiment of the present invention. The fourth embodiment is based on the second embodiment and further provided with a first overvoltage protection capacitor C1, or is based on the third embodiment and further provided with a second impedance capacitor Cd2. The connecting ways of the first overvoltage protection capacitor C1 and the second impedance capacitor Cd2 are the same as those of the second embodiment and the third embodiment, and thus will not be described. According to the above-mentioned working process and beneficial effect, the fourth embodiment can realize the overvoltage protection for the electrical energy receiving end, and the loss is small and the efficiency is high.

Figure 6:
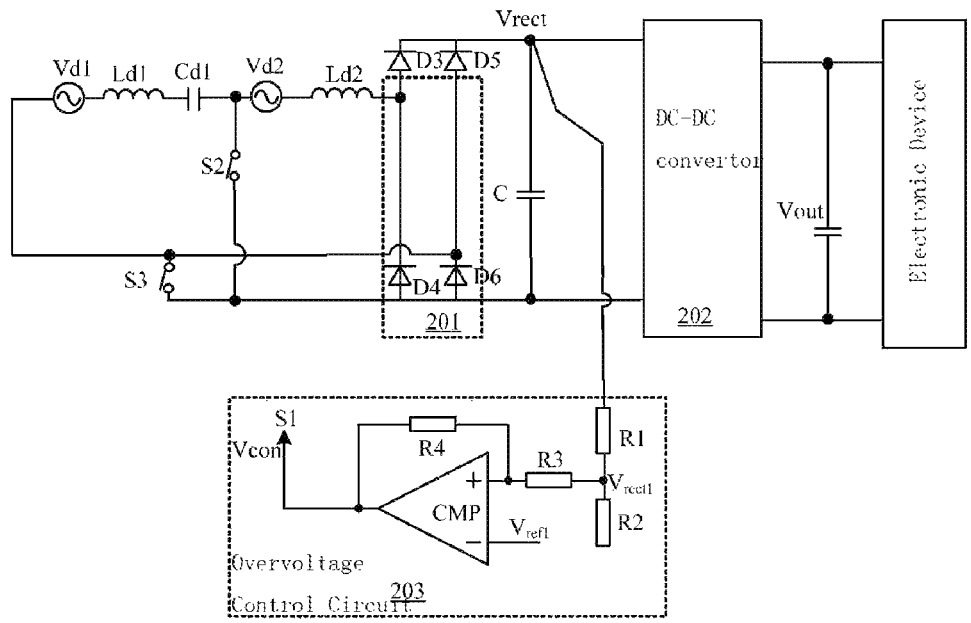
FIG. 6 is a circuit diagram of an electrical energy receiving end in accordance with a fifth embodiment of the present invention.

FIG. 6 is a circuit diagram of an electrical energy receiving end in accordance with a fifth embodiment of the present invention. In the fifth embodiment, the electrical energy receiving end includes a receiving coil Ld1, a second receiving coil Ld2, a first impedance capacitor Cd1. The connecting way is the same as the first embodiment. The first receiving coil is coupled with the spatial magnetic field generated by the electrical energy transmitting terminal to obtain a first alternating voltage signal Vd1. The second receiving coil is coupled with the spatial magnetic field generated by the electrical energy transmitting end to obtain a second alternating voltage signal Vd2. As shown in FIG. 6, the first alternating voltage signal Vd1 and the second alternating voltage signal Vd2 are connected in series to supply a voltage signal to the latter stage circuit. The differences are described hereinafter. In the fifth embodiment, the rectifier and filter circuit includes a full-bridge rectifier circuit 201 and a filter circuit C. The full-bridge rectifier circuit includes a third diode D3 and a fourth diode D4 which are connected in series, and a fifth diode D5 and a sixth diode D6 which are connected in series. The two pairs of series-connected diodes (D3, D4 and D5, D6) are then connected in parallel. A common connection terminal of the third diode D3 and the fifth diode D5 outputs a half-wave voltage signal. A common connection terminal of the fourth diode D4 and the sixth diode D6 is connected to the ground terminal. The filter capacitor C receives the half-wave voltage signal to obtain the DC voltage signal $V_{rect}$.

One end of the first receiving coil Ld1 is connected to the input terminal of the electrical energy receiving end. One end of the second receiving coil Ld2 is connected to a common connection point of the third diode D3 and the fourth diode D4.

Accordingly, in the fifth embodiment, the overvoltage protection switching circuit includes a second overvoltage protection switch S2 and a third overvoltage protection switch S3. The second overvoltage protection switch S2 is connected between the common connection point of the first impedance capacitor Cd1 and the second receiving coil Ld2 and the ground terminal. The third overvoltage protection switch S3 is connected between the input terminal of the electrical energy receiving end and the ground terminal. Both the second overvoltage protection switch S2 and the third overvoltage protection switch S3 control their switching operation by the switching control signal $V_{con}$, and the switching states of the second overvoltage protection switch and the third overvoltage protection switch are the same. The switching control signal $V_{con}$ in this embodiment is generated by the voltage control circuit 203. The circuit configuration and operating principle of the overvoltage control circuit 203 are the same as those of the first embodiment, and will not be described here.

As known from the working process of the first embodiment, in the fifth embodiment, under normal operation, the equivalent inductance of the first receiving coil Ld1 and the second receiving coil Ld2 and the capacitance of the first impedance capacitor Cd1 resonate with the system operating frequency. At this time, the system is operating at the maximum efficiency. When the overvoltage occurs in the circuit, the second overvoltage protection switch S2 and the third overvoltage protection switch S3 are turned on. The first receiving coil Ld1, the first impedance capacitor Cd1, the second overvoltage protection switch S2, and the third overvoltage protection switch S3 form a first current loop. The second receiving coil Ld2, the third diode D3, the sixth diode D6, the second overvoltage protection switch S2, and the third overvoltage protection switch S3 form a second current loop, or the second receiving coil Ld2, the fifth diode D5, the fourth diode D4, the second overvoltage protection switch S2, and the third overvoltage protection switch S3 form a second current loop. Similarly, because the impedance mismatch between the first impedance capacitor Cd1 and the first receiving coil Ld1, the energy of the coupling of the first receiving coil is reduced greatly, and the current of the first current loop won't be so large. For the second current loop, since the impedance of the second receiving coil Ld2 cannot be matched, the energy of transmission is small. Through the control of the second overvoltage protection switch S2 and the third overvoltage protection switch S3, the DC voltage signal $V_{rect}$ outputted from the rectifier and filter circuit drops to a value that doesn't exceed the preset voltage value.

Thus, the overvoltage protection control for the full-bridge rectifier and filter circuit can be realized by the above-described circuit. The overvoltage protection scheme of the fifth embodiment also has the advantageous effect that it is not necessary to add too many peripheral devices, and the control scheme is simple and clever. The technical scheme can be used in a wireless electrical energy transmission device with a full-bridge rectifier and filter circuit.

Figure 7:
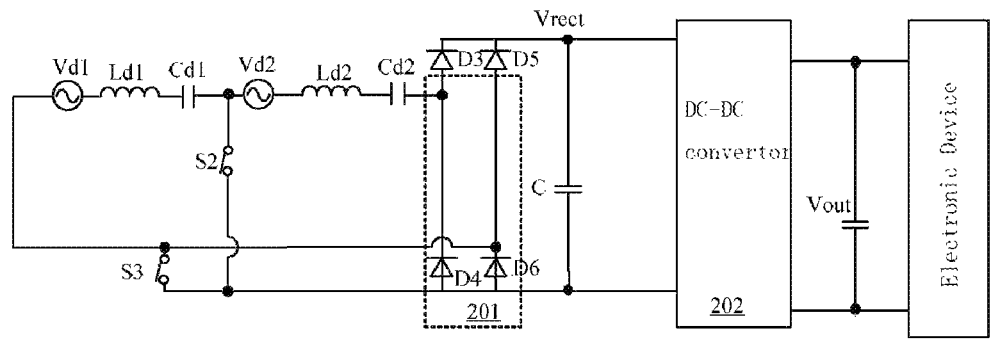
FIG. 7 is a circuit diagram of an electrical energy receiving end in accordance with a sixth embodiment of the present invention.

FIG. 7 is a circuit diagram of an electrical energy receiving end in accordance with a sixth embodiment of the present invention. The sixth embodiment is based on the fifth embodiment, and is further provided with a second impedance circuit. As shown in FIG. 7, the second impedance circuit is specifically a second impedance capacitor Cd2. The second impedance capacitor Cd2 is connected between the second receiving coil Ld2 and the rectifier and filter circuit. The overvoltage control circuit of the sixth embodiment is the same as that of the first embodiment, and is not shown in FIG. 7.

The working process of the sixth embodiment may refer to that the fifth embodiment, with the exceptions described hereinafter. In the sixth embodiment, when the overvoltage occurs in the circuit, the second overvoltage protection switch S2 and the third overvoltage protection switch S3 are turned on. Because the impedance mismatch between the first receiving coil Ld1 and the first impedance capacitor Cd1, the current of the first current loop is small. By providing the first impedance capacitor Cd1 and the second impedance capacitor Cd2, the current of the first current loop can be further reduced. Meanwhile, because the impedance mismatch between the second receiving coil Ld2 and the second impedance capacitor Cd2, the current of the second current loop is reduced, such that the energy outputted to the rectifier and filter circuit can be reduced and the DC voltage signal $V_{rect}$ can be rapidly decreased.

Figure 8:
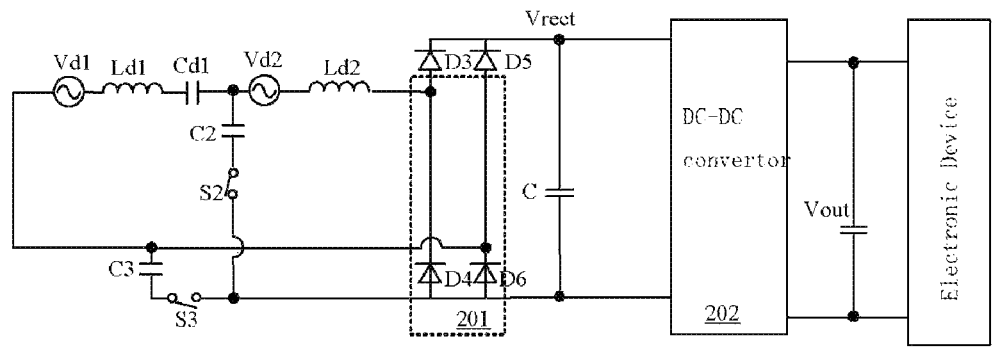
FIG. 8 is a circuit diagram of an electrical energy receiving end in accordance with a seventh embodiment of the present invention.

FIG. 8 is a circuit diagram of an electrical energy receiving end in accordance with a seventh embodiment of the present invention. The seventh embodiment is based on the fifth embodiment, and is further provided with a second overvoltage protection capacitor C2 and a third overvoltage protection capacitor C3. The second overvoltage protection capacitor C2 and the second overvoltage protection switch S2 are connected in series between the common connection joint of the first impedance capacitor Cd1 and the second receiving coil and the ground terminal. The third overvoltage protection capacitor C3 and the third overvoltage protection switch S3 are connected in series between the input terminal of the electrical energy receiving end and the ground terminal.

The working process of the seventh embodiment may refer to that of the fifth embodiment, with the exceptions described hereinafter. In the seventh embodiment, when the overvoltage occurs in the circuit, the second overvoltage protection switch S2 and the third overvoltage protection switch S3 are turned on. The first receiving coil Ld1, the first impedance capacitor Cd1, the second overvoltage protection capacitor C2, the second overvoltage protection switch S2, the third overvoltage protection capacitor C3, and the third overvoltage protection switch S3 form a first current loop. The second receiving coil Ld2, the third diode D3, the sixth diode D6, the filter capacitor C, the second overvoltage protection capacitor C2, the second overvoltage protection switch S2, the third overvoltage protection capacitor C3, and the third overvoltage protection switch S3 form a second current loop. Since the first impedance capacitor Cd1 and the first receiving coil Ld1 do not resonate due to the impedance mismatch, the energy of the coupling of the first receiving coil is greatly reduced, and the current of the first current loop won't be so large. In the seventh embodiment, The second overvoltage protection capacitor C2 and the third overvoltage protection capacitor C3 make the degree of the mismatch between the first impedance capacitor Cd1 and the first receiving coil Ld1 greater, and the current of the first current loop becomes smaller, and the switching loss is less. Furthermore, when the equivalent capacitance of the first overvoltage protection capacitor C2 and the third overvoltage protection capacitor C3 and the resonant frequency of the second receiving coil Ld2 are set at the system operating frequency, the first overvoltage protection capacitor C2, the third overvoltage protection capacitor C3, and the second receiving coil Ld2 are parallel resonance, and the equivalent impedance of the first current loop approaches infinity, and the current of the loop is close to zero, and the system loss is very small. For the second current loop, the energy can be transmitted to the rectifier and filter circuit. By setting the turns ratio of the coils, the value of the second alternating voltage signal Vd2 is very small so that the overvoltage protection can be achieved.

It can be easily understood that the second overvoltage protection capacitor C2 and the third overvoltage protection capacitor C3 may be added to the sixth embodiment in the full-bridge rectifier filter circuit according to the inference of the fourth embodiment described above, or the second impedance capacitor Cd2 is added to the seventh embodiment to achieve the same overvoltage protection, with high efficiency and low loss.

Figure 9:
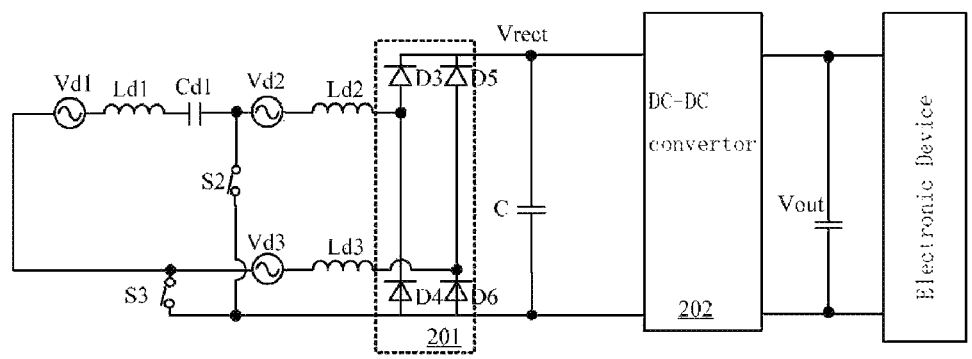
FIG. 9 is a circuit diagram of an electrical energy receiving end in accordance with an eighth embodiment of the present invention.

FIG. 9 is a circuit diagram of an electrical energy receiving end in accordance with an eighth embodiment of the present invention. The eighth embodiment is based on the fifth embodiment, and is further provided with a third receiving coil Ld3. The third receiving coil Ld3 is connected between the input terminal of the electrical energy receiving end and a common connection joint of the fifth diode D5 and the sixth diode D6.

In the eighth embodiment, the third receiving coil is coupled with the spatial magnetic field generated by the electrical energy transmitting terminal to obtain a third alternating voltage signal Vd3. As shown in FIG. 9, the first alternating voltage signal Vd1 and the second alternating voltage signal Vd2 are connected in series, and then connected with the third alternating voltage signal Vd3 in parallel to supply the energy to the latter stage circuit.

The working process of the eighth embodiment is substantially similar to that of the fifth embodiment with the exceptions described hereinafter. After the overvoltage occurs, the second receiving coil Ld2, the third diode D3, the sixth diode D6, the filter capacitor C, the third receiving coil Ld3, the second overvoltage protection switch S2, and the third overvoltage protection switch S3 form a second current loop, so that the second receiving coil Ld2 and the third receiving coil Ld3 jointly supply the energy to the post-stage rectifier and filter circuit. The turns ratio of the three coils may be set for the voltage signals Vd2 and Vd3 to be smaller.

The eighth embodiment also can realize the overvoltage protection function. Under normal operation, when the second overvoltage protection switch S2 and the third overvoltage protection switch S3 are turned off, the voltage of the second overvoltage protection switch S2 and the third overvoltage protection open S3 is maintained lower and the same to reduce the resistance to pressure.

Figure 10:
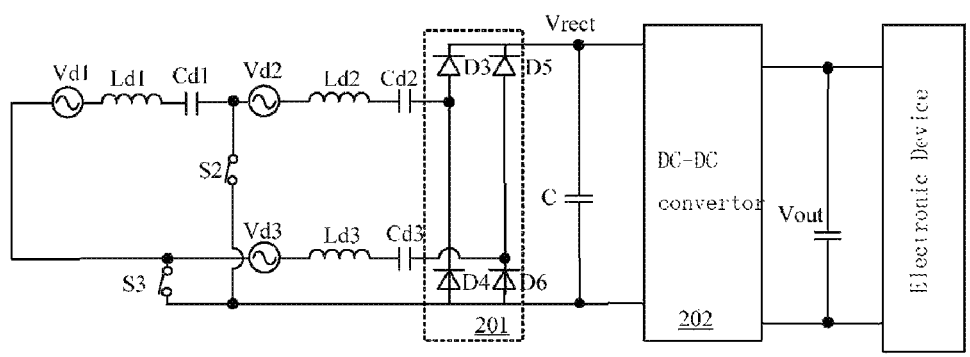
FIG. 10 is a circuit diagram of an electrical energy receiving end in accordance with a ninth embodiment of the present invention.

FIG. 10 is a circuit diagram of an electrical energy receiving end in accordance with a ninth embodiment of the present invention. The ninth embodiment is based on the eighth embodiment, and is further provided with a second impedance capacitor Cd2 and a third impedance capacitor Cd3. The second impedance capacitor Cd2 is connected between the second receiving coil and the rectifier and filter circuit. The third impedance capacitor Cd3 is connected between the third receiving coil and the rectifier and filter circuit.

Referring to the working process of the sixth embodiment, similarly, by providing the first impedance capacitor Cd1, the second impedance capacitor Cd2, and the third impedance capacitor Cd3, the current of the first current loop can be further reduced. Meanwhile, because the impedance mismatch between the second receiving coil Ld2, the third receiving coil Ld3, the second impedance capacitor Cd2, and the third impedance capacitor Cd3, the current of the second current loop is reduced, such that the energy outputted to the rectifier and filter circuit can be reduced and the DC voltage signal $V_{rect}$ can be rapidly decreased.

Figure 11:
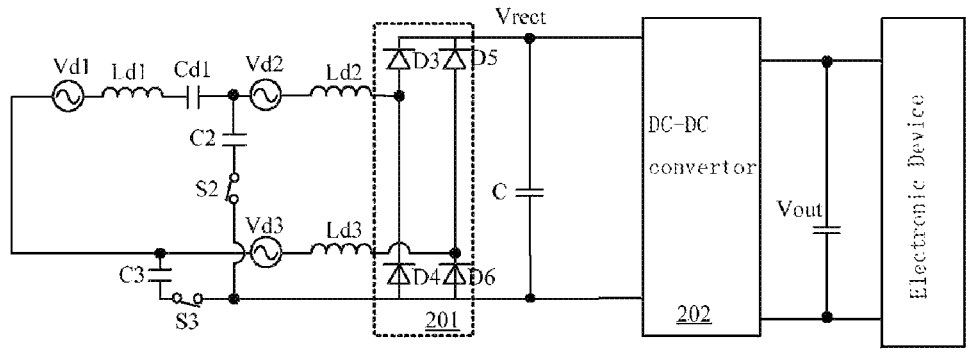
FIG. 11 is a circuit diagram of an electrical energy receiving end in accordance with a tenth embodiment of the present invention.

FIG. 11 is a circuit diagram of an electrical energy receiving end in accordance with a tenth embodiment of the present invention. The tenth embodiment is based on the eighth embodiment, and is further provided with a second overvoltage protection capacitor C2 and a third overvoltage protection capacitor C3. The second overvoltage protection capacitor C2 and the second overvoltage protection switch S2 are connected in series between the common connection joint of the first impedance capacitor and the second receiving coil and the ground terminal. The third overvoltage protection capacitor C3 and the third overvoltage protection switch S3 are connected in series between the input terminal of the electrical energy receiving end and the ground terminal. The working process of the tenth embodiment may refer to that of the seventh embodiment. Similarly, the tenth embodiment also achieves the same overvoltage protection, with high efficiency and low loss.

Finally, the second overvoltage protection capacitor C2 and the third overvoltage protection capacitor C3 may be added to the ninth embodiment according to the inference of the fourth embodiment described above, or the second impedance capacitor Cd2 and the third impedance capacitor Cd3 are added to the tenth embodiment to achieve the same overvoltage protection, with high efficiency and low loss.

The above-described embodiments have been described in detail with respect to the electrical energy receiving end capable of overvoltage protection and the wireless electrical energy transmission device. The electrical energy receiving end of the present invention divides the electrical energy receiving coil into a first receiving coil and a second receiving coil, so that under normal operation the first receiving coil and the second receiving coil jointly resonate with the impedance matching network to receive energy. When the electrical energy receiving end having has an overvoltage, the first receiving coil and the impedance matching network (or the second receiving coil and the impedance matching network) form a loop, and due to the impedance mismatch, the energy received by the electrical energy receiving end is greatly reduced to solve the problem of overvoltage at the electrical energy receiving end.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:
1. An electrical energy receiving end capable of overvoltage protection, used for receiving energy transmitted from a spaced electrical energy transmitting end, the electrical energy receiving end comprising a receiving coil, an imped- ance matching network, a rectifier and filter circuit, a DC-DC converter, and an overvoltage protection switching circuit;

the receiving coil comprising a first receiving coil and a second receiving coil, the first receiving coil and the second receiving coil being orderly connected in series between an input terminal of the electrical energy receiving end and the rectifier and filter circuit;

the impedance matching network comprising a first impedance circuit connected in series with the first receiving coil, the receiving coil resonating with the impedance matching network to be coupled with magnetic field energy transmitted from the electrical energy transmitting end to generate a high-frequency alternating voltage signal;

the rectifier and filter circuit receiving the high-frequency alternating voltage signal to generate a DC voltage signal;

the DC-DC converter receiving the DC voltage signal to convert to a desired output voltage to an electronic device;

the overvoltage protection switching circuit being connected in series between the receiving coil and a ground terminal, wherein when the DC voltage signal exceeds a preset voltage value after detection, a switching state of the overvoltage protection switching circuit is controlled through a switching control signal, enabling the DC voltage signal not to exceed the preset voltage value.

2. The electrical energy receiving end as claimed in claim 1, further comprising an overvoltage control circuit to generate the switching control signal, the overvoltage control circuit comprising a sampling circuit and a hysteresis comparator;

the sampling circuit sampling the DC voltage signal to obtain a sampled voltage signal;

the hysteresis comparator receiving the sampled voltage signal and a first reference voltage signal to output the switching control signal;

wherein when the sampled voltage signal is greater than an upper limit voltage value of the hysteresis comparator, the switching control signal is in an effective state for controlling the overvoltage protection switching circuit to be turned on; wherein when the sampled voltage signal is less than a lower limit voltage value of the hysteresis comparator, the switching control signal is in a dull state for controlling the overvoltage protection switching circuit to be turned off.

3. The electrical energy receiving end as claimed in claim 1, wherein the rectifier and filter circuit comprises a half-bridge rectifier circuit and a filter capacitor;

wherein the half-bridge rectifier circuit comprises a first diode and a second diode, the first diode is connected between the second receiving coil and the ground terminal, the second diode is connected between the second receiving coil and the filter capacitor, and the half-bridge rectifier circuit receives the high-frequency alternating voltage signal to output a half-wave voltage signal;

wherein the filter capacitor receives the half-wave voltage signal to obtain the DC voltage signal.

4. The electrical energy receiving end as claimed in claim 3, wherein the first impedance circuit comprises a first impedance capacitor, and the first impedance capacitor is connected between the first receiving coil and the second receiving coil;

wherein the overvoltage protection switching circuit comprises a first overvoltage protection switch, and the first overvoltage protection switch is connected between a common connection point of the first impedance capacitor and the second receiving coil and the ground terminal.

5. The electrical energy receiving end as claimed in claim 4, wherein the impedance matching network further comprises a second impedance circuit, the second impedance circuit comprises a second impedance capacitor, and the second impedance capacitor is connected between the second receiving coil and the rectifier and filter circuit.

6. The electrical energy receiving end as claimed in claim 4, wherein the overvoltage protection switching circuit further comprises a first overvoltage protection capacitor, the first overvoltage protection capacitor and the first overvoltage protection switch are connected in series between the first impedance capacitor and the ground terminal.

7. The electrical energy receiving end as claimed in claim 1, wherein the rectifier and filter circuit comprises a full-bridge rectifier circuit and a filter circuit;

wherein the full-bridge rectifier circuit comprises a third diode and a fourth diode which are a first pair of diodes connected in series, and a fifth diode and a sixth diode which are a second pair of diodes connected in series, the two pairs of series-connected diodes are then connected in parallel, a common connection terminal of the third diode and the fifth diode outputs a half-wave voltage signal, and a common connection terminal of the fourth diode and the sixth diode is connected to the ground terminal;

wherein the filter capacitor receives the half-wave voltage signal to obtain the DC voltage signal.

8. The electrical energy receiving end as claimed in claim 7, wherein an end of the first receiving coil is connected to the input terminal of the electrical energy receiving end, and an end of the second receiving coil is connected to a common connection point of the third diode and the fourth diode;

wherein the first impedance circuit comprises a first impedance capacitor, and the first impedance capacitor is connected between the first receiving coil and the second receiving coil;

wherein the overvoltage protection switching circuit comprises a second overvoltage protection switch and a third overvoltage protection switch, the second overvoltage protection switch is connected between a common connection point of the first impedance capacitor and the second receiving coil and the ground terminal, and the third overvoltage protection switch is connected between the input terminal of the electrical energy receiving end and the ground terminal;

wherein both the second overvoltage protection switch and the third overvoltage protection switch control their switching operation through the switching control signal, and switching states of the second overvoltage protection switch and the third overvoltage protection switch are the same.

9. The electrical energy receiving end as claimed in claim 8, wherein the impedance matching network further comprises a second impedance circuit, the second impedance circuit comprises a second impedance capacitor, and the second impedance capacitor is connected between the second receiving coil and the rectifier and filter circuit.

10. The electrical energy receiving end as claimed in claim 8, wherein the overvoltage protection switching circuit further comprises a second overvoltage protection capacitor and a third overvoltage protection capacitor, the second overvoltage protection capacitor and the second overvoltage protection switch are connected in series between the common connection joint of the first impedance capacitor and the second receiving coil and the ground terminal, and the third overvoltage protection capacitor and the third overvoltage protection switch are connected in series between the input terminal of the electrical energy receiving end and the ground terminal.

11. The electrical energy receiving end as claimed in claim 8, further comprising a third receiving coil, the third receiving coil being connected between the input terminal of the electrical energy receiving end and a common connection joint of the fifth diode and the sixth diode.

12. The electrical energy receiving end as claimed in claim 11, further comprising a second impedance circuit and a third impedance circuit;

the second impedance circuit comprising a second impedance capacitor, the second impedance capacitor being connected between the second receiving coil and the rectifier and filter circuit;

the third impedance circuit comprising a third impedance capacitor, the third impedance capacitor being connected between the third receiving coil and the rectifier and filter circuit.

13. The electrical energy receiving end as claimed in claim 11, wherein the overvoltage protection switching circuit further comprises a second overvoltage protection capacitor and a third overvoltage protection capacitor, the second overvoltage protection capacitor and the second overvoltage protection switch are connected in series between the common connection joint of the first impedance capacitor and the second receiving coil and the ground terminal, and the third overvoltage protection capacitor and the third overvoltage protection switch are connected in series between the input terminal of the electrical energy receiving end and the ground terminal.

14. A wireless electrical energy transmission device, comprising an electrical energy transmitting end and an electrical energy receiving end which are spaced apart from each other, the electrical energy receiving end being as claimed in claim 1.

\* \* \* \* \*